(12) United States Patent
Pöchlauer et al.

(10) Patent No.: US 9,327,263 B2
(45) Date of Patent: May 3, 2016

(54) STEPWISE EXECUTION OF EXOTHERMIC REACTIONS WITH PARTICIPATION OF CARBOCATIONS

(75) Inventors: Peter Pöchlauer, Linz (AT); Martina Kotthaus, Linz (AT); Martin Vorbach, Linz (AT); Martin Deak, Hohenems (AT); Thomas Zich, Linz (AT); Rolf Marr, Graz (AT)

(73) Assignee: ESIM Chemicals GmbH, Linz (AT)

( * ) Notice: Subject to any disclaimer, the term of this patent is extended or adjusted under 35 U.S.C. 154(b) by 2535 days.

(21) Appl. No.: 11/920,847

(22) PCT Filed: Apr. 26, 2006

(86) PCT No.: PCT/EP2006/003859
§ 371 (c)(1),
(2), (4) Date: Jun. 2, 2008

(87) PCT Pub. No.: WO2006/125502
PCT Pub. Date: Nov. 30, 2006

(65) Prior Publication Data
US 2008/0306300 A1    Dec. 11, 2008

(30) Foreign Application Priority Data

May 23, 2005    (AT) .................................. A 873/2005

(51) Int. Cl.
| | | |
|---|---|---|
| *C07C 231/06* | (2006.01) | |
| *B01J 19/00* | (2006.01) | |
| *B01J 19/18* | (2006.01) | |
| *B01J 19/24* | (2006.01) | |
| *B01F 13/00* | (2006.01) | |
| *F28D 21/00* | (2006.01) | |

(52) U.S. Cl.
CPC .............. *B01J 19/0093* (2013.01); *B01J 19/18* (2013.01); *B01J 19/2415* (2013.01); *B01F 13/0059* (2013.01); *B01J 2219/0004* (2013.01); *B01J 2219/00822* (2013.01); *B01J 2219/00867* (2013.01); *B01J 2219/00871* (2013.01); *B01J 2219/00873* (2013.01); *B01J 2219/00889* (2013.01); *B01J 2219/00984* (2013.01); *B01J 2219/00997* (2013.01); *F28D 2021/0052* (2013.01); *F28F 2260/00* (2013.01)

(58) Field of Classification Search
CPC .... B01J 19/0093; B01J 19/2415; B01J 19/18; B01J 2219/0097; B01J 2219/00867; B01J 2219/00822; B01J 2219/00873; B01J 2219/0004; B01J 2219/00871; B01J 2219/00984; B01J 2219/00889; F28D 2021/0052; F28F 2260/00

USPC ......................................................... 564/131
See application file for complete search history.

(56) References Cited

U.S. PATENT DOCUMENTS

| | | | |
|---|---|---|---|
| 3,151,157 | A | 9/1964 | Fugate et al. |
| 2004/0013587 | A1 | 1/2004 | Holl et al. |

FOREIGN PATENT DOCUMENTS

| | | |
|---|---|---|
| DE | 199 35 691 A1 | 2/2001 |
| DE | 199 46 367 A1 | 3/2001 |
| DE | 103 21 472 A1 | 12/2004 |
| EP | 0846678 A1 | 6/1998 |
| EP | 0 903 174 A1 | 3/1999 |
| EP | 1 123 734 A2 | 8/2001 |
| JP | 11-171857 A | 6/1999 |
| JP | 2000-159736 * | 6/2000 |
| JP | 2000159736 * | 6/2000 |
| JP | 4018084 B2 | 12/2007 |
| JP | 4308087 B2 | 8/2009 |
| WO | WO0109064 A1 | 2/2001 |
| WO | 01/83466 | 8/2001 |

OTHER PUBLICATIONS

JP 2000159736, English abstract only, 2000.*
International Search Report for PCT/EP2006/003859 mailed Sep. 26, 2006.
Office Action for CN-200680017995.6, mailed Dec. 11, 2009, 6 pages of English Translation.
Notice of Decision to Grant for CN-200680017995.6, mailed Nov. 24, 2010, 5 pages.
Decision to Grant for EA-200702591, mailed Jun. 22, 2009, 2 pages.
Decision to Grant for EP-06753420.6, mailed May 12, 2011, 2 pages without English Translation.
First Examination Report for IN-9148/DELNP/2007, mailed Jul. 16, 2013, 2 pages.
Notice of Reasons for Rejection for JP-2008-512710, mailed Dec. 20, 2011, 5 pages.
Notice of Reasons for Rejection for JP-2008-512710, mailed Apr. 17, 2012, 5 pages.
Decision to Grant for JP-2008-512710, mailed Jul. 31, 2012, 5 pages.

* cited by examiner

*Primary Examiner* — Shailendra Kumar
(74) *Attorney, Agent, or Firm* — Pierce Atwood LLP; Raymond G. Arner

(57) ABSTRACT

The invention relates to a method for carrying out reactions with participation of carbocations, whereby the initial most strongly exothermic phase of the reaction is carried out at high temperature (60 to 120° C.) and short residence time (1 to 30 seconds) in a microreactor and the subsequent less exothermic phases are carried out at optionally lower temperatures in two or more residence time units with longer residence times (1 to 30 seconds).

7 Claims, No Drawings

STEPWISE EXECUTION OF EXOTHERMIC REACTIONS WITH PARTICIPATION OF CARBOCATIONS

This application is the U.S. national phase of International Application No. PCT/EP2006/003859, filed 26 Apr. 2006, which designated the U.S. and claims priority to Australia Patent Application No. A873/2005, filed 23 May 2005, the entire contents of each of which are hereby incorporated by reference.

Reactions which proceed with participation of carbocations, e.g. Ritter reactions, electrophilic addition reactions onto alkenes, or Friedel-Crafts alkylation reactions, generally proceed exothermically and mostly with little selectivity, and with high reaction rate. When strong acids are used in these reactions, corrosion problems also occur. For these reasons, a number of disadvantages arise when these reactions are carried out industrially:

To permit control of generation of heat from the reaction, these reactions are normally executed at lower temperatures than would be necessary or advisable on chemical grounds.

In order to control the reaction, attempts are also made to provide a high level of backmixing, but this can cause decomposition of previously formed product.

The production-scale reaction is executed more slowly than the reaction rate would permit, so that the reaction can proceed in controlled fashion.

The yields are mostly only moderate, sometimes by virtue of formation of byproducts and sometimes by virtue of incomplete conversion.

Finally, there is always a high level of hazard because of the large amount of very reactive starting materials and intermediates.

To avoid safety problems with highly exothermic reactions, and to achieve higher yields, the literature proposes carrying out these reactions in a microreactor.

For example, WO 01/23328 describes the execution of Friedel-Crafts alkylation reactions of organic compounds in a microreactor, composed of a mixing element and optionally of a residence section.

EP 1 500 649 discloses that in-situ quench reactions, such as the reaction of aryl bromides with butyllithium to give aryllithium compounds with subsequent reaction with an electrophile can be executed in a microreactor optionally with following residence time unit.

The use of microreactors optionally with following residence time section is also known for other processes. Examples of these are the preparation of dihydropyrones (WO 02/068403), the coupling of organic compounds (WO 02/00577), the transfer of alkylidene groups to organic compounds (WO 02/00576), the acid-catalyzed homogenous cleavage of cumene hydroperoxide (WO 01/30732), etc.

In these processes, the entire reaction is executed in the microreactor, and therefore it is generally only very fast reactions that are suitable for this purpose. Furthermore, the above processes achieve markedly smaller yields than would be possible theoretically. Thruput and selectivity of the processes described hitherto are also unsatisfactory.

It was an object of the present invention to find a process which permits the execution of reactions with participation of carbocations with, in comparison with the prior art, increased thruput and increased yield and selectivity.

Unexpectedly, this object could be achieved by dividing the reaction into a plurality of steps, where the most strongly exothermic phase of the reaction is executed at the highest temperature and shortest residence time, and the following, less exothermic phases are executed at optionally lower temperatures and longer residence times.

The present invention therefore provides an improved process for the execution of reactions with participation of carbocations, which comprises carrying out the most strongly exothermic initial phase of the reaction at a high temperature and short residence time in a microreactor, and execution of the subsequent less exothermic phases at optionally lower temperatures in two or more residence time units with longer residence time.

The inventive process is suitable for the execution of reactions with participation of carbocations.

Examples of these reactions are Ritter reactions, electrophilic addition reactions onto alkenes, or Friedel-Crafts alkylation reactions, etc.

It is preferable that the inventive process is used for Ritter reactions, where carbocations are reacted with a nitrile. Examples of a source used here for the carbocations are alcohols, alkenes, etc.

It is particularly preferable that the process is used for the preparation of diacetoneacrylamide via reaction of acrylonitrile with diacetone alcohol, acetone, or mesityl oxide, in the presence of sulfuric acid, and then hydrolysis.

The invention executes the reactions with participation of carbocations in a plurality of phases.

The first phase is the most strongly exothermic initial phase.

This phase is executed at high temperature and short residence time in a microreactor.

Suitable microreactors here are any of the familiar microreactors, as known from the literature, for example from DE 39 26 466 C2, U.S. Pat. No. 5,534,328, DE 100 40 100, WO 96/30113, EP 0 688 242, EP 1 031 375, or else publications from Mikrotechnik Mainz GmbH, Germany, or from "Microreactors; Wolfgang Ehrfeld, Volker Hessel, Holger Löwe; Wiley-VHC; ISBN 3-527-29590-9; Chapter 3 Micromixers", or else commercially available microreactors, for example from Institut für Mikrotechnik, Mainz GmbH, Cellular Process Chemistry GmbH or Mikroglass AG.

Microreactors whose use is preferred comprise a mixing module and a heat-exchange module.

The mixing modules used preferably have the design of static mixers, based on various functional principles. By way of example, these can be T-type mixers, microjet reactors, substream injection mixers, Y- or V-type mixers, interdigital mixers, rectangular mixers, slot mixers, triangular multilamination mixers, caterpillar mixers, cyclone micromixers, or combinations of these.

It is preferable that the inventive process uses cyclone micromixers or T-type mixers.

The mixing module is combined with a heat-exchange module which comprises from one to a plurality of micro-heat-exchangers.

Examples of suitable micro-heat-exchangers are microcrossflow heat-exchangers, crossflow heat-exchangers with crossmixing, or stacked countercurrent heat-exchangers, etc.

It is preferable to use crossflow heat-exchangers.

The microreactors used optionally have a thermostatable mixing site.

The invention mixes the appropriate starting materials for the reaction in the microreactor, and the residence time of the reaction mixture in the microreactor in this phase is short.

A short residence time here preferably means, as a function of the respective reaction executed and temperature, from 1 to 30 sec, preferably from 3 to 20 sec.

The reaction temperature is highest in this phase and, as a function of the reaction executed and of the temperature of the coolant, is from 60 to 120° C.

If the reactions executed are Ritter reactions, the residence time in the microreactor is preferably from 5 to 20 sec, the reaction temperature being from 70 to 110° C.

In the particularly preferred Ritter reaction for the preparation of diacetoneacrylamide via reaction of acrylonitrile with diacetone alcohol, acetone, or mesityl oxide, in the presence of sulfuric acid, and then hydrolysis, the residence time in the microreactor is from 5 to 20 sec and the reaction temperature is from 70 to 110° C., preferably from 75 to 100° C.

Following the first phase of the reaction, the reaction mixture is transferred to a first residence time unit, in which the reaction mixture continues to react in a phase which is then less exothermic, the result being an increase in the yields of the desired end product.

Suitable residence time units are known by way of example from EP 1 157 738 or EP 1 188 476. However, the residence time unit can also be a simple residence time section, such as a capillary, a heat-exchanger, such as a spiral heat-exchanger, a plate heat-exchanger, or an optionally thermostatable loop reactor, or else a simple stirred tank, or a stirred-tank cascade. It is preferable to use a heat-exchanger, a stirred tank, a stirred-tank cascade, or a thermostatable loop reactor.

The residence time in this residence time unit is longer than the residence time in the microreactor, and is from 1 minute to 30 minutes. The reaction temperature in this phase is the same as in the microreactor or lower by from 5 to 30° C.

In the case of the Ritter reaction preferably executed for the preparation of diacetoneacrylamide via reaction of acrylonitrile with diacetone alcohol, acetone or mesityl oxide, in the presence of sulfuric acid, and then hydrolysis, the reaction temperature in the residence time unit is from 60 to 100° C., and the residence time is from 1 to 20 minutes.

Following this first residence time unit, there is another residence time unit and optionally further residence time units.

There is preferably one further following residence time unit. It is particularly preferable that this is a simple stirred tank or a stirred-tank cascade.

In this second residence time unit, the final afterreaction then takes place, the result being another increase in yield.

The residence time in this unit is the longest here and is from 1 to 10 hours.

The reaction temperature in this unit is, in contrast, the lowest, and is from 30 to 70° C.

This staged temperature profile and the staged residence times permit, particularly in the preparation of diacetoneacrylamide, a marked yield increase as far as above 78% (crude yield), compared with about 61% (crude yield) for a conventional procedure.

Alongside the higher achievable yield through the inventive conduct of the reaction, the reaction proceeds faster and more selectively, while avoiding the risk posed by high-energy starting materials or intermediates.

EXAMPLE 1

Use of a Spiral Heat-exchanger for the First Residence Time Unit

A reaction solution with a stoichiometric molar ratio of acrylonitrile (AN) to diacetone alcohol (DiAOH) to $H_2SO_4$=1.0:1.0:2.4 had a residence time of 12 s at 90° C. in the microreactor (composed of a mixing module made from Hastelloy and of a heat-exchange module), 100 s at 90° C. in the spiral heat-exchanger, and two hours at 50° C. in the continuous stirred tank.

The total yield of diacetoneacrylamide was 78%, based on ACN, the proportions of the final conversion being 74% in the first 12 s, 21% in the following 100 s, and 5% in the remaining 2 h.

EXAMPLES 2-6

Execution was analogous to example 1. Table 1 shows starting materials used, residence times, temperatures, and yields:

TABLE 1

| AN | DiAOH | $H_2SO_4$ | Microreactor | Spiral heat-exchanger | Stirred tank | Yield |
|---|---|---|---|---|---|---|
| 1.0 | 1.0 | 2.4 | 12 s/90° C. | 100 s/90° C. | 2 h/50° C. | 78% |
| 1.0 | 1.0 | 2.2 | 4 s/95° C. | 108 s/75° C. | 2 h/55° C. | 78% |
| 1.0 | 1.0 | 2.2 | 12 s/95° C. | 100 s/65° C. | 3 h/50° C. | 76% |

| AN | Acetone | $H_2SO_4$ | Microreactor | Spiral heat-exchanger | Stirred tank | Yield |
|---|---|---|---|---|---|---|
| 1.0 | 2.3 | 2.53 | 12 s/80° C. | 450 s/80° C. | 4 h/50° C. | 58% |

EXAMPLE 7

The reaction led to a final yield of 73.5%, using a stoichiometric ratio of AN to DiaOH to $H_2SO_4$=1.0:1.0:2.2 and a residence time distribution, with 90° C. for 12 s in the microreactor, with 65° C. for 960 s in the first continuous stirred tank and with 55° C. for 10 800 s in the second continuous stirred tank.

EXAMPLE 8-10

Execution was analogous to example 7. Table 2 shows the starting materials used, residence times, temperatures, and yields:

| AN | DiAOH | $H_2SO_4$ | Microreactor | 1st continuous stirred tank | 2nd continuous stirred tank | Yield |
|---|---|---|---|---|---|---|
| 1.0 | 1.0 | 2.2 | 12 s/90° C. | 960 s/70° C. | 3 h/55° C. | 70.4% |
| 1.0 | 1.0 | 2.2 | 12 s/90° C. | 960 s/65° C. | 3 h/55° C. | 73.5% |
| 1.0 | 1.0 | 2.2 | 12 s/85° C. | 960 s/65° C. | 3 h/55° C. | 72.1% |

The invention claimed is:

1. An improved process for the execution of a reaction with participation of carbocations, which comprises:
    (a) carrying out a most strongly exothermic initial phase of the reaction in a microreactor at a high temperature of from 60 to 120° C. and a short residence time of 1 to 30 seconds, and then subsequently
    (b) carrying out less exothermic phases of the reaction in two or more residence time units, wherein the residence time in a first residence time unit is from 1 to 30 minutes and the reaction temperature in the first residence time unit is lower by 5 to 30° C. than the microreactor.

2. The process as claimed in claim 1, wherein, for the initial phase, microreactors are used which have a mixing module from the group of the T-type mixers, microjet reactors, substream injection mixers, Y- or V-type mixers, interdigital mixers, rectangular mixers, slot mixers, triangular multilamination mixers, caterpillar mixers, cyclone micromixers, or combinations of these, and a heat-exchange module which has from one to a plurality of microheat-exchangers from the group of the micro-crossflow heat-exchangers, crossflow heat-exchangers with crossmixing, or stacked countercurrent heat-exchangers.

3. The process as claimed in claim 1, wherein the first residence time unit following the microreactor comprises at least one of a capillary, a heat-exchanger, an optionally thermostatable loop reactor, a stirred tank, or a stirred-tank cascade.

4. The process as claimed in claim 1, which comprises using a stirred-tank or a stirred-tank cascade is used as a second residence time unit.

5. The process as claimed in claim 1, wherein the residence time in a second residence time unit following the first residence time unit is from 1 to 10 hours, and the reaction temperature in the second residence time unit is from 60 to 100° C.

6. The process as claimed in claim 1, wherein the reaction is a Ritter reaction which is executed as a reaction with participtation of carbocations.

7. The process as claimed in claim 1, wherein, the reaction with participation of carbocations is a reaction of acrylonitrile with diacetone alcohol, acetone, or mesityl oxide, in the presence of sulfuric acid, followed by hydrolysis to give diacetoneacrylamide.

* * * * *